US011275617B2

(12) United States Patent
Das et al.

(10) Patent No.: US 11,275,617 B2
(45) Date of Patent: Mar. 15, 2022

(54) SELF-MANAGED INTELLIGENT ELASTIC CLOUD STACK

(71) Applicant: Accenture Global Solutions Limited, Dublin (IE)

(72) Inventors: Jagaran Das, Durgapur (IN); Nikhil S. Tanwar, London (GB); Abdul Rahman Zafar, Plano, TX (US); Hossam E. Elsherif, West Windsor, NJ (US)

(73) Assignee: Accenture Global Solutions Limited, Dublin (IE)

( * ) Notice: Subject to any disclaimer, the term of this patent is extended or adjusted under 35 U.S.C. 154(b) by 467 days.

(21) Appl. No.: 16/453,206

(22) Filed: Jun. 26, 2019

(65) Prior Publication Data
US 2020/0004591 A1    Jan. 2, 2020

(30) Foreign Application Priority Data

Jun. 27, 2018  (IN) .............................. 201841023995

(51) Int. Cl.
| | |
|---|---|
| *G06F 9/46* | (2006.01) |
| *G06F 9/50* | (2006.01) |
| *H04L 29/06* | (2006.01) |
| *H04L 67/1031* | (2022.01) |

(52) U.S. Cl.
CPC .......... *G06F 9/5011* (2013.01); *H04L 63/083* (2013.01); *H04L 67/1031* (2013.01)

(58) Field of Classification Search
None
See application file for complete search history.

(56) References Cited

U.S. PATENT DOCUMENTS

| | | | | |
|---|---|---|---|---|
| 9,329,909 | B1* | 5/2016 | Khanna ................. | G06F 9/5072 |
| 9,524,111 | B1* | 12/2016 | Manden ................ | H04L 47/743 |
| 2010/0005473 | A1* | 1/2010 | Blanding ............. | G06F 9/5083 718/104 |
| 2011/0213686 | A1* | 9/2011 | Ferris ................. | G06Q 30/0283 705/34 |
| 2012/0260228 | A1* | 10/2012 | Mallick ................ | G06F 8/60 717/104 |
| 2013/0254360 | A1* | 9/2013 | Anderson ............. | H04L 67/10 709/223 |

(Continued)

OTHER PUBLICATIONS

Accenture, *Acceenture Insights Platform for Government*, 2017 (12 pp).

(Continued)

*Primary Examiner* — Adam Lee
(74) *Attorney, Agent, or Firm* — Crowell & Moring LLP

(57) ABSTRACT

A cloud resource control circuitry may provide an automatic, self-managed, and a real-time elasticity in an active cloud stack including a software stack. The cloud resource control circuitry particularly adjusts cloud computing resources allocated to the active cloud stack based on real-time remote monitoring of resource utilization of the software stack. The resource adjustment may be performed in a stepwise fashion, in a pipelined manner as to the various layers of a software stack, and using hierarchical approach as to levels of cloud computing resources (e.g., task/level, server level, virtual machine/cloud level), to provide a more efficient cloud computing environment.

20 Claims, 7 Drawing Sheets

(56) References Cited

U.S. PATENT DOCUMENTS

| | | | |
|---|---|---|---|
| 2014/0089495 A1 | 3/2014 | Akolkar et al. | |
| 2017/0116021 A1* | 4/2017 | Miller | H04L 41/12 |
| 2017/0149681 A1* | 5/2017 | Chen | G06F 9/46 |
| 2018/0024860 A1 | 1/2018 | Balle et al. | |
| 2018/0027093 A1* | 1/2018 | Guim Bernat | H04L 41/0816 709/221 |
| 2018/0137771 A1* | 5/2018 | Wahidy | A61B 5/369 |
| 2019/0065221 A1* | 2/2019 | Chauhan | H04L 67/34 |

OTHER PUBLICATIONS

Ring, Katy, *Accenture Insights Platform powers its managed analytics-as-a-service capability*, www.451Research.com, Mar. 28, 2016, 451 Research, LLC (4 pp.).

Office Action in India Application No. 201841023995, dated Dec. 18, 2020, 7 pages.

* cited by examiner

SELF-MANAGED INTELLIGENT ELASTIC CLOUD STACK

CROSS REFERENCE

This application claims priority to Indian Application No. 201841023995, filed with the Indian Patent Office on Jun. 27, 2018, the entirety of which is incorporated herein by reference.

TECHNICAL FIELD

This disclosure relates to a system for achieving a dynamic, automatic, self-managed, and elastic cloud computing stack.

BACKGROUND

Rapid advances in communications, computing, and storage technologies, driven by immense demand, have resulted in widespread adoption of cloud systems for maintaining, processing, and analyzing large amount of diverse structured or unstructured data. As one example, modern enterprise systems presently maintain and analyze data records of many petabytes in size. Processing of such data may be implemented as a software stack including various data processing tools interconnected as a data pipeline for performing, e.g., data preparation, data validation, data cleaning, data analytics, and data presentation/visualization. Such a data analytics stack may be implemented using cloud computing resources. Efficient use of cloud computing resources may be achieved by including an intelligent monitoring and control system that provides self-management and resource elasticity to such a data analytics stack.

DETAILED DESCRIPTION

Figure 1:
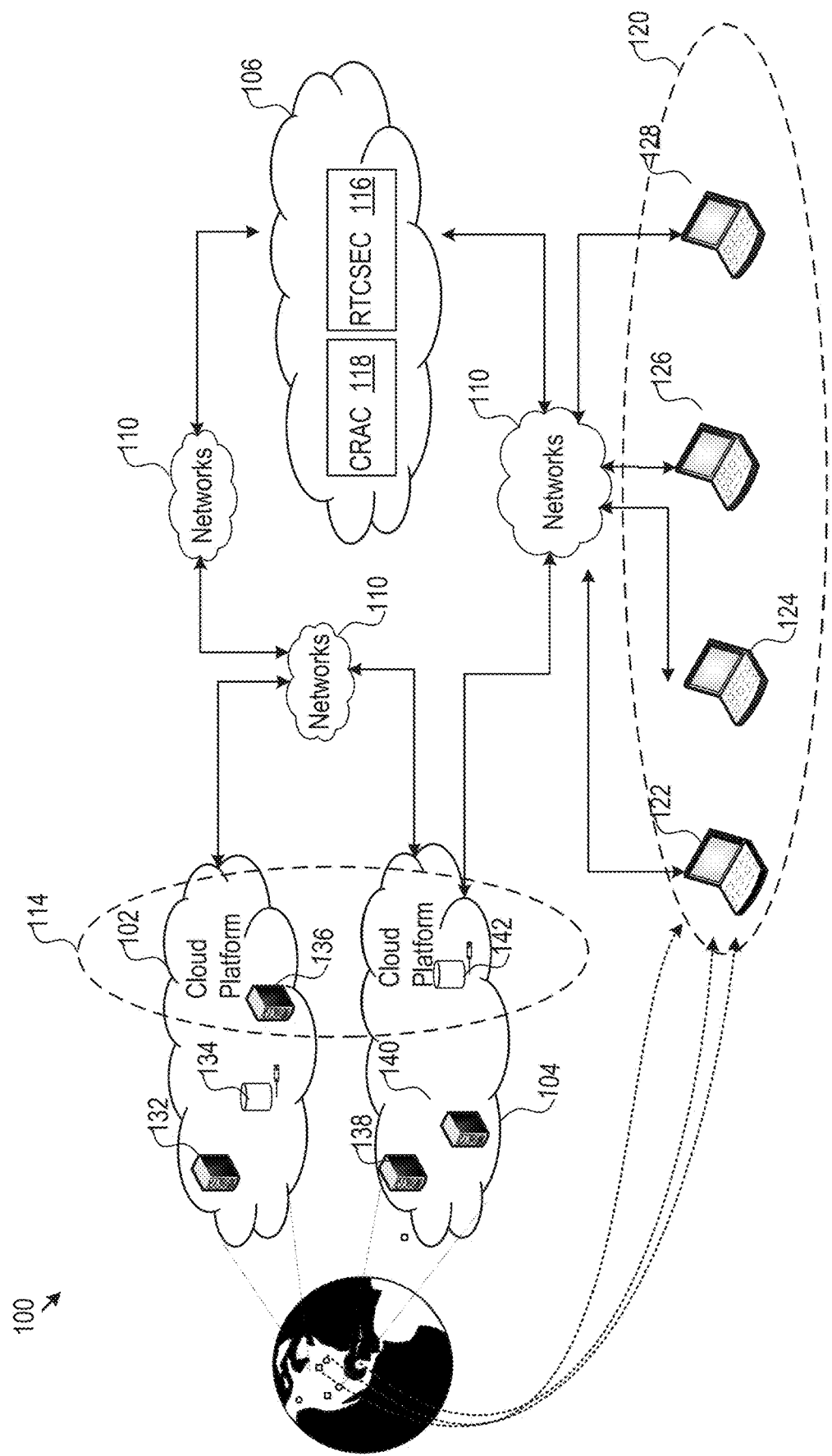
FIG. 1 shows an exemplary global environment for enabling self-managed and elastics cloud stack.

In cloud computing systems, computing resources such as virtual machines, memory, processor cores, serverless computing threads, and software components/systems may be requisitioned for planned or on-demand utilization. For example, a software stack of inter-communicating software components/tools configured for a particular project running on cloud computing platforms (collectively referred to as a cloud stack) may be requested as a service and the computing resources may be pre-allocated for the project based on its estimated resource requirement predicted from historical data and other characteristics associated with the project. The actual resource usage for the project upon deployment, however, may vary unexpectedly, e.g., for different environments and at different stages of the project. Elastically and automatically adjusting computing resource allocation to such an actively running software stack on a local level (for each individual software component within the stack) and a global level (for the entire software stack) and anywhere in between in real-time may provide more efficient and more economic use of cloud computing resources. Accordingly, there is demand for provisioning of automatic, real-time, dynamic, elastic, and multi-level control and adjustment of computing resource allocation in an actively deployed cloud stack.

The cloud resource control circuitry discussed herein provides a cloud resource control circuitry as a technical solution to the technical problem of improving cloud computing efficiency by adding elasticity to a cloud stack. The cloud control circuitry further uses unconventional techniques to achieve an automatic, self-managed, and real-time elasticity in a cloud stack. Specifically, this disclosure provides a cloud resource control circuitry for achieving real-time elasticity in a deployed and actively running cloud stack by adjusting the resources allocated to the cloud stack i) in a stepwise fashion, ii) in a staged manner as to the various layers of the software stack, and iii) using hierarchical approach as to the levels of computing resources (e.g., task/level, server level, virtual machine/cloud level), iv) based on different set of levels depending on the type of layers (cluster resource or non-cluster resource, as will be described below), v) with a single user interface for controlling cloud stack using diverse resources from different cloud resource providers, and vi) with multi-level secure access and credential control for users. Such an implementation provides technical solution to a problem of achieving real-time elasticity of cloud stacks and efficiency of consuming cloud computing resources. The resource allocation and elasticity problem is rooted in computer technology as such problems do not have equivalents in other technical fields and cannot be performed in human minds. The solution provided above further relies on various prediction models trained using historical data and using machine-learning algorithms and such prediction tasks are not performable using pens and papers, and human minds.

FIG. 1 shows a global cloud computing system 100 including a resource control circuitry for deploying and self-managing cloud stacks and for providing real-time elasticity to deployed cloud stacks. In particular, the global cloud computing system 100 may include various cloud platforms 102 and 104, the resource control circuitry 106, and user devices 120, 122, 124, and 126 for accessing the cloud platforms 102 and 104, and for accessing the resource control circuitry 106. As shown in FIG. 1, each of these system components of the global cloud computing system 100 may be located anywhere in the world and each system component may further be distributed over multiple locations. All system components of the global cloud computing system 100 may be interconnected by communication networks 110. The networks 110 may include private and public wireless or wireline networks defined by, for example, any known network protocols.

The cloud platforms 102 and 104 may each provide various types of hardware resources including but not limited to core processors, program and data memories, permanent storages, and the like (illustrated by resources 132-142 of FIG. 1). These computing resources may be configured into higher level virtual resources such as virtual machines and virtual storage servers. Each of these virtual computing entities may be implemented as centralized or distributed physical hardware resources. Each of the cloud platforms 102 and 104 may provide its application programming interface (API) for requesting, accessing, configuring, and managing the computing resources from the cloud platform for a particular user of the cloud platform. The cloud platforms 102 and 104 may be provided and provisioned by independent cloud vendors. As such, each cloud platform may provide its own cloud computing capabilities and specifying its own API for requesting, managing, and modifying computing resource allocation. As an example, cloud platforms 102 and 104 may include but are not limited to Accenture Cloud Platform (ACP®), AWS® (Amazon Web Services) of Amazon, Azure® of Microsoft, and Google Cloud Platform™.

Computing resources in the cloud platforms 102 and 104 may be allocated to a particular user or user group for a particular project. A collection of software components needed for the project may be installed to run on the allocated computing resources. These software components may inter-communicate to form a software stack, which may, together with the computing resources allocated from the cloud platforms 102 and 104, form a cloud stack 114, as indicated in FIG. 1. As such, a cloud stack may refer to a virtual multi-layered computer architecture that defines the interaction and communication of software and hardware resources at multiple layers. The Open Systems Interconnection (OSI) model is an example of a stack-type architecture. The layers of a stack may pass data and hardware resources among themselves to facilitate efficient and accurate data processing.

A particular user project may be partitioned into different environments. For example, a web portal development project may be partitioned into environments including but not limited to dev/test and production environments. In some implementations, these environments may be allocated separate non-sharable sets of cloud computing resources. As such, each environment may be implemented in the cloud independent of other environments, and when deployed, may be treated as its own cloud stack allocated with its own cloud computing resources installed with its own software stack. Access to different environments by users may be independently authenticated.

A particular cloud stack for a particular user project may be configured to draw computing resources within a single cloud platform 102 or 104, or may alternatively be implemented across cloud platforms 102 and 104. In one implementation, different types of cloud resources from different cloud platforms may be combined to implement a particular cloud stack for a particular project (or a particular environment of a particular project). For example, virtual machines of Google Cloud Platform™ may be configured together with storage services of AWS™ in a particular cloud stack.

The software components in the software stack of the cloud stack 114, including various software tools needed for the project as well as various operating systems, may be provided by the user for installation on the allocated computing resources in the cloud stack 114. Alternatively, the software components may be provided by the cloud platform vendors as a service. Further, the software components may be provided by third party software vendors.

The resource control circuitry 106 of FIG. 1 may include a Cloud Resource Allocation Circuitry (CRAC) 118 and a Real-Time Cloud Stack Elasticity Circuitry (RTCSEC) 116. The CRAC 118 may be responsible for receiving requisitions from users or user groups for initially allocating resources to configure and establish cloud stacks according to requirements by the users or user groups. The CRAC 118 may be configured to include prediction models for automatically estimating resource requirements according to user requisition. The CRAC 118 may further be responsible for deploying the cloud stack according to the estimated resource requirements by automatically interacting with cloud platform vendors via APIs for cloud resource allocation on behalf of the users or user groups. The CRAC may further be responsible for configuring software stacks in the cloud stack according to user request and requirements. The CRAC may interact with software distributors and/or draw from open source repositories to configure the software stack on behalf of the users or user groups.

The RTCSEC 116 may be configured to provision and monitor a deployed and actively running cloud stack, and automatically provide real-time elasticity to the active cloud stack by adjusting cloud resource allocation for the active cloud stack in a stepwise, staged, and hierarchical manner (see detailed description below). In the scenario that a single cloud platform, e.g., cloud platform 102, is relied on by the cloud stack 114, the function of CRAC 118 and/or RTCSEC 116 may be part of the service provided by the vendor of the cloud platform 102 (e.g., Amazon). In one implementation, CRAC 118 and RTCSEC 116 may be provided and implemented independent of the providers of the cloud platforms 102 and 104, by, e.g., a third party service integrator. One advantage of such independency from cloud platform vendors is that the CRAC 118 and RTCSEC 116 may be provided for pooling computing resources from multiple cloud platforms and for supporting cloud stacks that span across the multiple cloud platforms in a seamless manner and with a uniform user interface.

The resource control circuitry 106 including the CRAC 118 and RTCSEC 116 may be implemented using dedicated servers, storage hardware, and other computing recourses necessary for supporting its allocation and elasticity control functions. Alternatively, CRAC 118 and/or RTCSEC 116, similar to cloud stacks they are designed to provision, may likewise be implemented in the cloud, and as one or more cloud stacks. As such, elasticity of a cloud stack may be controlled in real time by another cloud stack. Further, even though CRAC 118 and RTCSEC 116 are shown as separate circuitries in FIG. 1, they may be implemented as a single undivided circuitry.

The users or user groups 120-126 may be enterprise or institutional users embodied as user devices. For example, FIG. 1 shows an enterprise user 120. The enterprise user 120 may include individual users 122-128. Users 122-128 may be categorized according to their roles. As such, enterprise user 120 may include user groups where each user group may include one or more of users 122-128. A cloud stack may be requisitioned by the enterprise user 120 for, e.g., a particular group or groups of users collaborating on a particular project. The project may include different environments (e.g., web portal design project may include dev/test environment, production environment, and the like). Each user within the collaborating user group may be responsible for a subset of tasks. As such, remote access to the cloud stack for the users 122-128 may be role based and environment based. Such remote access may be gained using user terminal devices 122-128 (note that 122-128 are used to represent either users or user terminal devices). A user terminal device may take any suitable form including but not limited to personal desktop computer, a laptop computer, a mobile telephone, a personal digital assistance device, and the like. The users may also be provided with remote access to the resource control circuitry 106 for, e.g., managing cloud stacks and for access dashboards that provide numerical or graphical representation of the operating status of the cloud stacks. User remote access to the resource manger 106 may be provided by, for example, a web interface.

Figure 2:
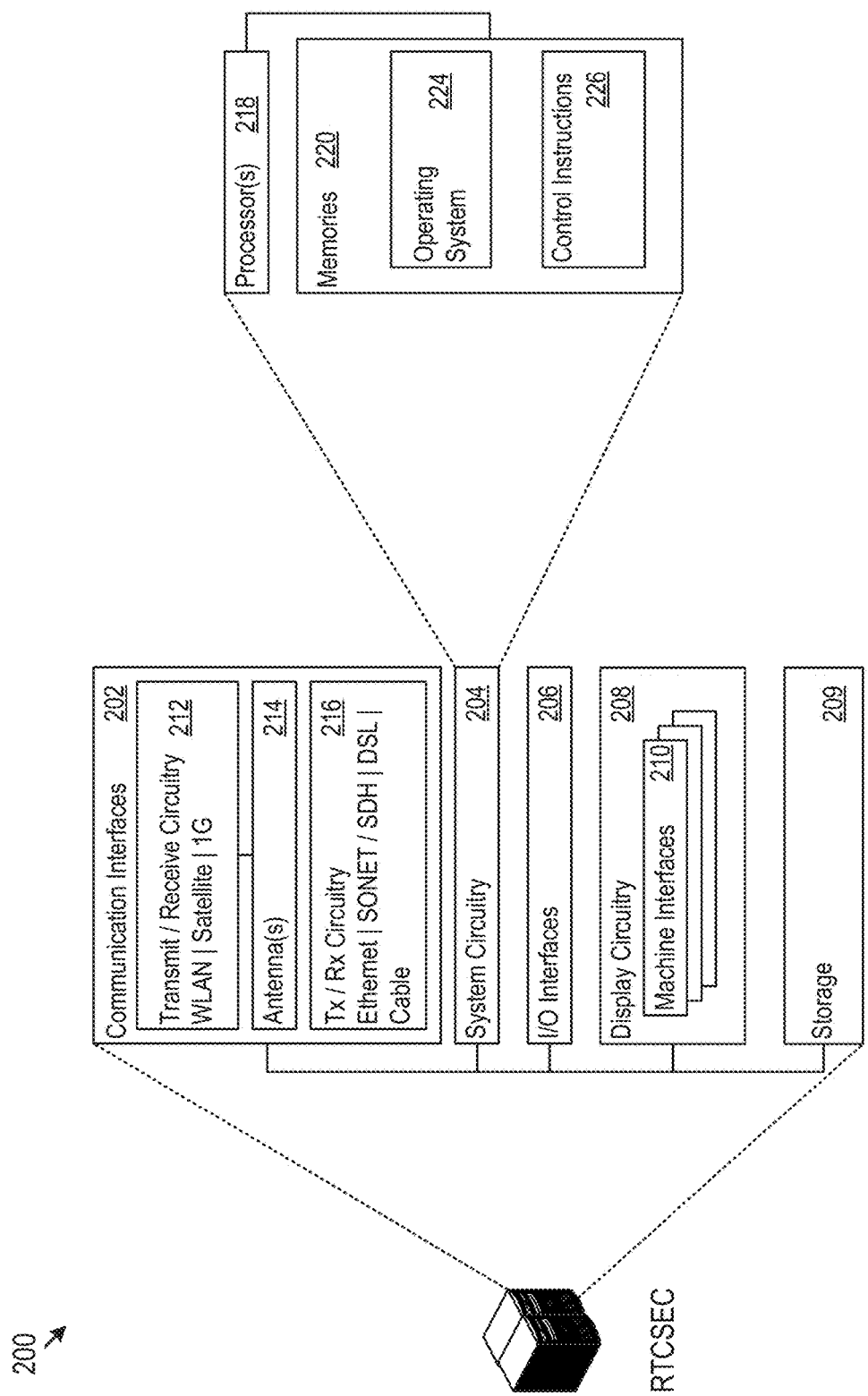
FIG. 2 shows an exemplary composition of a typical hardware configuration for the resource control circuitry of FIG. 1.

The computing resources for supporting the functioning of the resource control circuitry 106 (including the CRAC 118 and RTCSEC 116), either dedicated or from the cloud, may be based on the computer system 200 shown in FIG. 2. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11 ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 209 may be used to store various initial, intermediate, or final data or model needed for the resource control circuitry 106. The storage 209 may be centralized or distributed, and may be local or remote to the computer system 200.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality related to the resource control circuitry 106. As just one example, the system circuitry 204 may include one or more instruction processors 218 and memories 220. The memories 220 stores, for example, control instructions 226 and an operating system 224. In one implementation, the instruction processors 218 executes the control instructions 226 and the operating system 224 to carry out any desired functionality related to the resource control circuitry 106.

Figure 3:
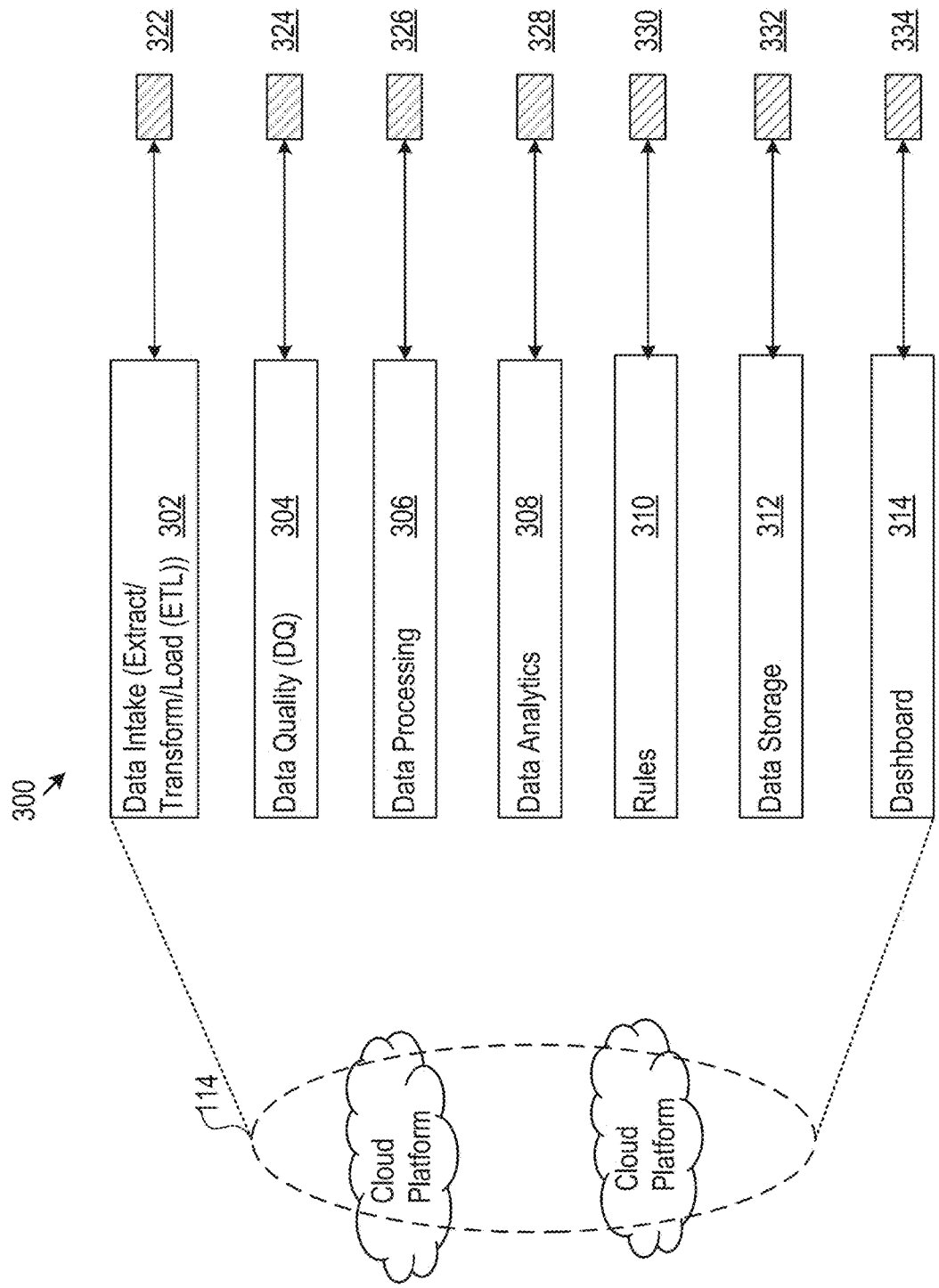
FIG. 3 shows an exemplary specific execution environment for the cloud resource control stack of FIG. 1.

FIG. 3 illustrates an exemplary software stack 300 of the cloud stack 114. The software stack 300 may include software components needed for the project that the cloud stack 114 is allocated for. For example, the software stack may include software components that are used by a group of developers to develop a computer game. As such, the software components may include programming tools, art/graphical design tools, data modeling/simulation tools and the like. For another example, the software stack may be configured for supporting marketing analysis for an enterprise. Correspondingly, the software components in such a stack may include various data processing, analytics and modeling tools.

A data analytics stack 300 for an enterprise is shown in FIG. 3 as an example. Such a data analytics stack may be configure for in-taking and processing a large amount of various structured or unstructured data collected from various data sources internal or external to the enterprise. These data may be processed and analyzed in the form of an integrated data pipeline consisting of various software components for data preparation, transformation, loading, quality control, cleaning, analytics, storage, virtualization, and visualization/presentation.

These software components may be designed for particular aspects or stages of data processing and may be categorized accordingly. For example, FIG. 3 shows that the software components for the data analytics stack 300 may be organized and categorized in layers 302, 304, 306, 308, 310, 312, and 314. Each layer may include one or more software components. The software components in stack 300 may communicate and pass data or other parameters between each other in an inter-layer or intra-layer manner.

In particular, layer 302 may include software components for data intake/loading and preparation of data, such as data extraction, transformation and loading (ETL). Examples of ETL tools may include but are not limited to PowerCenter™ of Informatica™, Oracle Warehouse Builder™ of Oracle, IBM Infosphere DataStage™, and ETL Studio™ of SAS™. The data that are extracted, transformed and loaded in layer 302 may then be processed by software components in the data quality (DQ layer) 304. The DQ layer may include software components that check and measure data completeness, accuracy, consistency, and relevancy, and identify and correct other data quality issues. Examples of DQ tools may include but are not limited to Data Quality of Informatica, DataFlus of SAS, Quality Stage of IBM, and DBQS of DBQS. Data processing layer 306 of stack in FIG. 3, for example, may include software components that using conventional methods for data analysis. Examples of data processing tools may include but are not limited to Java™ and Python™. Data analytics layer 308 may include software components that perform data analytics using various models and architectures. The data analytics layer 308 may be further responsible for development of data analytics models, such as predict models trained using historical data collected and analyzed by the data pipeline and based on various machine learning algorithms. Examples of data analytics tools include but are not limited to Spark™ and Hadoop MapReduce™ for large scale data analytics. Rule layer 310 includes software components that provide, for example, business rule management, specification, enforcement, and reasoning. Examples of tools for rule management include but are not limited to Drools™, Jobss™, and BRMS™. The data storage layer 312 include software components that are responsible to organizing and maintain the input, intermediate, and processed data in a proper architecture. These software components further provide mechanisms to access the stored data by other layers of the stack 300. Example of data storage layer tools include but are not limited to Hadoop Distributed File System (HDFS), H-base of Cloudera, Cloudera Operational DB, Cloudera analytical DB, IBM DB2, Apache Cassandra, Google Cloud Bigtable, and Azure DocumentDB™. The dashboard layer 314 may include software components that are responsible for data virtualization, visualization, and presentation. Examples of dashboard tools include but are not limited to Tableau™ and OlikView™.

The layer configuration of the software stack 300 is merely illustrated as an example. The software stack 300 may be arranged using different layers, and in different orders. Each layers may be divided into sublayers. These layers and sublayers do not need to be completely sequential with respect to their data dependency. Some layers or sublayers (collectively referred to as layers) may be in parallel with other layers. Based on the data dependency, each of these layers may be referred to as an upstream layer, a middle layer, or a downstream layer. These terms are used only to represent relative sequential relationship between the layers rather than absolute positions of the layers in the stack. For example, a middle layer only needs to directly or indirectly consume data generated or processed by an upstream layer, and a downstream layer only needs to directly or indirectly consume data generated or processed by a middle layer. An upstream layer, a middle layer, and a downstream layer do not need to be consecutive, e.g., there may be other layers in between. Further, an upstream layer, a middle layer, and a downstream layer may each be any one or combination of the ETL layer 302, the DQ layer 304, the data processing layer 306, the data analytics layer 308, the rules layer 310, the data storage layer 312, and the dashboard layer 314 in the example of FIG. 3. Due to the data dependency between the layers, resource utilization of preceding layers in the software stack may provide an indication of resource utilization of later layer.

In some implementations, an entire suite of the software components of the stack 300 may be provided by a tool integrator. For example, Informatica™ may provide a distribution of a suite of software components for the various layers of the stack 300. For another example, Cloudera™ Distributions including Hadoop (CDH) provides another suite of software components for the various layers of the stack 300. In some other implementations, software components from a combination of vendors may be used in the cloud stack 300.

According to manners in which the underlying cloud computing resources are used by the software components in the cloud stack 114, each software component may be classified as either a non-cluster type or a cluster type. As will be shown below, such labels are maintained by the resource control circuitry 106 and used as part of the basis for determining real-time computing resource adjustment action for the cloud stack 114 to achieve elasticity for improved efficiency and economy in resource consumption by the cloud stack.

For example, a cluster type of software component may run in a distributed fashion, e.g., on multiple computing nodes. Each computing node may be associated with a physical machine or may be associated with a virtual machine. The multiple computing nodes may interact with each other under the control of a cluster type of software in concerted manner to achieve a particular data processing, analytics, or storage function. For example, multi-node data file storage tool using HDFS would be categorized as a cluster type. Data analytics using Hadoop MapReduce™, for another example, would also be categorized as a cluster type.

A non-cluster type of software component, on the other hand, may run on a dedicated physical machine or dedicated virtual machine. For example, ETL software components for data intake/extraction, transformation, and load are typically of non-cluster type (even though a cluster type of ETL tool may be and is contemplated herein). One difference between a cluster software component and a non-cluster software component is that, while only computing resources within the dedicated physical machine or virtual machine may be adjusted to achieve elasticity for a non-cluster software component, a number of nodes (or number of physical machines or virtual machines) may be additionally adjusted to achieve further elasticity for a cluster software component.

While some software components in a particular layer of FIG. 3 may be of cluster type and other software components in the same layer may be of non-cluster type, the particular layer may be generally characterized as cluster layer or non-cluster layer. For example, the type (cluster or non-cluster) for a layer may be determined by the majority type of the software components in the layer. Alternatively, the type for the layer may be determined by the most used or the most important software component or components. As will be discussed in the examples below, elasticity may be controlled at the layer level rather than individual software component level and in manners that depends on the type of the layer. In some common implementations, the ETL layer 302, the DQ layer 304, the rules layer 310, and the dashboard layer 314 may be characterized as non-cluster type. The data processing layer 206 may be characterized as cluster type. The data analytics layer 308 and storage layer 312 may be characterized as cluster type, or non-cluster type, depending on the specific software components included in these layers.

Continuing with FIG. 3, the stack 300 may be installed with a plurality of monitoring plugins (or agents) 322, 324, 326, 328, 330, 332, and 334. These agents may communicate with a monitoring component in the resource control circuitry 16 of FIG. 1. The function of these agents is to monitor in real-time various usage and other parameters of the various software components in the stack 300. These usage parameters may be monitored for each of the software components in the stack 300 or on a global level of the stack 300. An example of monitoring system with plugins may be provided by Nagios™. These parameters monitored by the monitoring agents or obtained via other sources may include but are not limited to:

CPU utilization and load for each software component;
memory utilization for each software component;
disk utilization for each software component;
environment type under which a software component is used;
cloud type for the cloud resources on which a software is running (such as cloud vendor, who may specify permissible cloud resource adjustment actions, such as minimum incremental step for increase a particular cloud resource, e.g., memory allocation);
total number of active users (active user count) for each software component;
unique user count for each software component;
business priority for having weightages of a software component, indicating how important a particular software is to the project;
seasonal information for time series data;
total number of tickets raised for the stack for if a customer support function is provided for the stack; and
network utilization for each software component (number of bytes being transferred to and from the software component).

Figure 4:
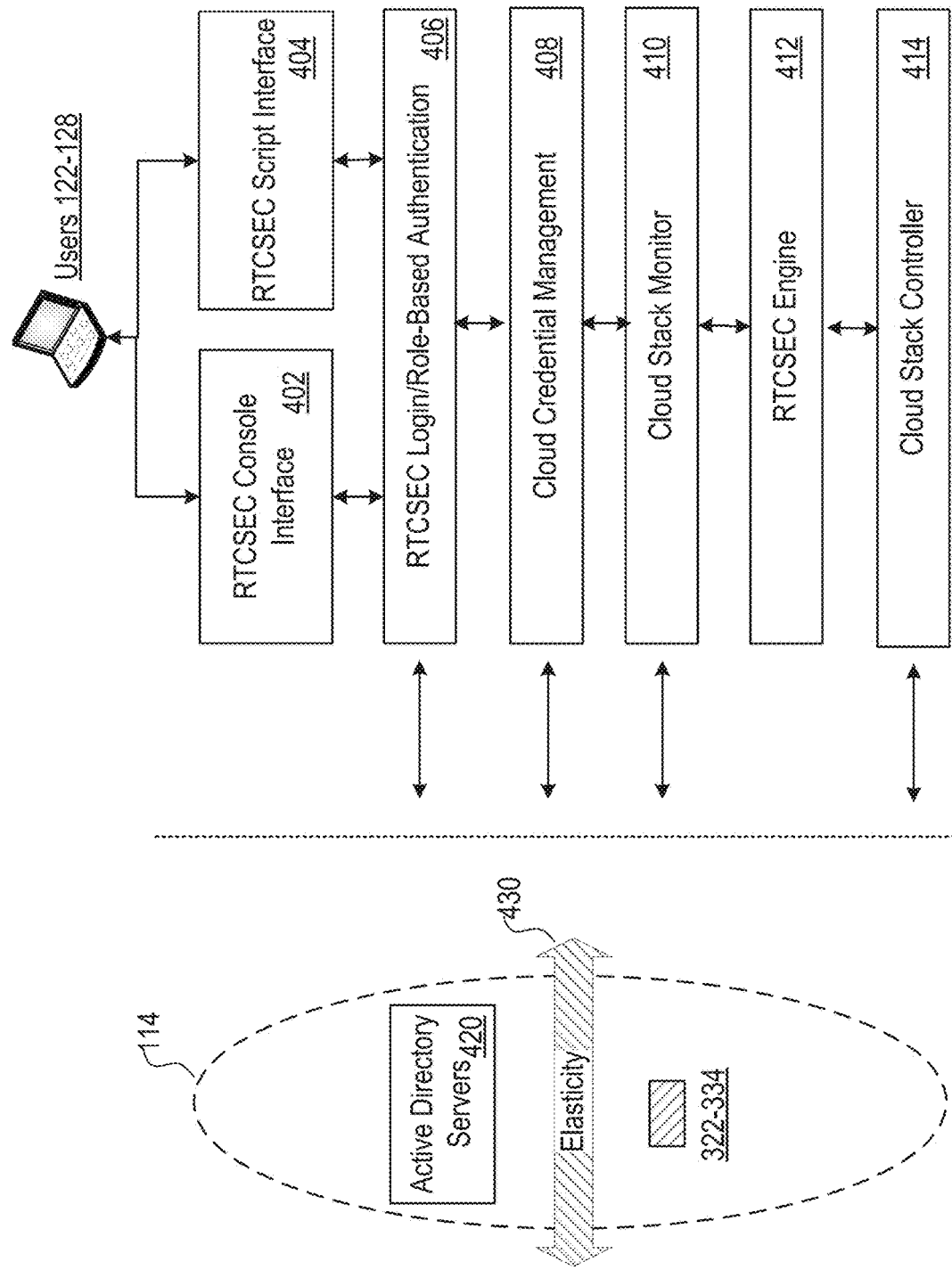
FIG. 4 shows an exemplary data and logic flow of a cloud resource control circuitry of FIG. 1 for dynamic, automatic, and elastic resource control for a cloud stack.

The elasticity of the cloud stack 114 of FIG. 1 (including the software stack 300 of FIG. 3 and the cloud computing resources allocated to run the software stack) may be enabled in real-time by the RTCSEC 116 of the resource control circuitry 106 of FIG. 1. A logic and data flow diagram for an exemplary implementation of the RTCSEC 116 is shown in FIG. 4. The RTCSEC of FIG. 4 includes a console interface 402, a script interface 404, a user login and authentication function unit 406, a cloud credential management function unit 408, a cloud stack monitoring function unit 410, a main processing engine 412, and a cloud stack controller unit 414. The console interface 402 and script interface 404 may be in communication with user devices 122-128 of FIG. 1 and provide user access to the RTCSEC. The various function units of the RTCSEC may be in communication with the various components of the cloud stack 114, such as active directory servers 420 and the monitoring plugins or agents 322-334, to provide real-time elasticity 430 to the cloud stack 114. The arrows showing data communications between the various function units are only illustrative rather than complete. Data communications between the function units that are not indicated with arrows in FIG. 4 may nevertheless exist. The function units of the RTCSEC above may be implemented by the circuitries of the physical or virtual computing resources as shown in FIG. 2.

The cloud credential management function unit 408 may be responsible for managing cloud service credential encryption and management. In particularly, all cloud vendors may give service credentials for accessing cloud resources programmatically (e.g., Access Key ID for AWS™, Service Principal for Azure™, and Service Account Token for GCP™). The cloud credential management function unit 408 may thus include a utility to encrypt and store the service credentials along with username and project/client name so that the RTCSEC may communicate with various cloud vendors for requesting resource allocation and adjustment for a particular project. In one implementation, in order to make sure accountability is honored, username and user's own service credentials are used to perform actions on cloud.

User access to RTCSEC may be based on a console interface (such as a console interface implemented in a web-browser) on a user device in communication with the console interface 402 and the login and authentication function unit 406. The login and authentication function unit 406 may be responsible for user login and authentication. Users may be authenticated via a multi-factor authentication scheme. The authentication may include but not limited to user account username/password with the enterprise, user account username/password with the RTCSEC, and enterprise account username/password with the RTCSEC. Security measures against brute force, DDOS and other bot attack may be additionally implemented based on one or more of, for example, Google Recaptcha™, TOTP or HOTP protocols using One Time passwords. The authentication may be role-base, associating a user with particular set of cloud stacks, and with a particular set of environments and/or software components within a particular cloud stack.

User access to RTCSEC may alternatively be script-based. A script may be communicated to the script interface 404 of the RTCSEC for further execution. In some implementations, in order to enable script based access to RTCSEC, behind-the-firewall mechanism may be used as per standard security compliance and in order to avoid hacks. In some implementations, the access point for user script may be implemented on endpoints separate from the access point via the console interface 402. For example, the script access endpoint may be placed behind a firewall of the enterprise. The RTCSEC may expose an authorization token on successful authentication and role check. Once the successful role-based authentication is validated. Script can submit the operation which will be executed on cloud vendor and logged.

Continuing with FIG. 4, the cloud stack monitor function unit 410 interacts with the monitoring agent 322-334 in the cloud stack for collecting various resource usage parameters for the software components in the cloud stack 114, as discussed above. These parameters may be then be processed by the RTCSEC engine 412 to form adjustment actions. These adjustment actions may be processed and communicated by the cloud stack controller 414 to the cloud stack 114 as well as the cloud platform vendors for execution.

Figure 5:
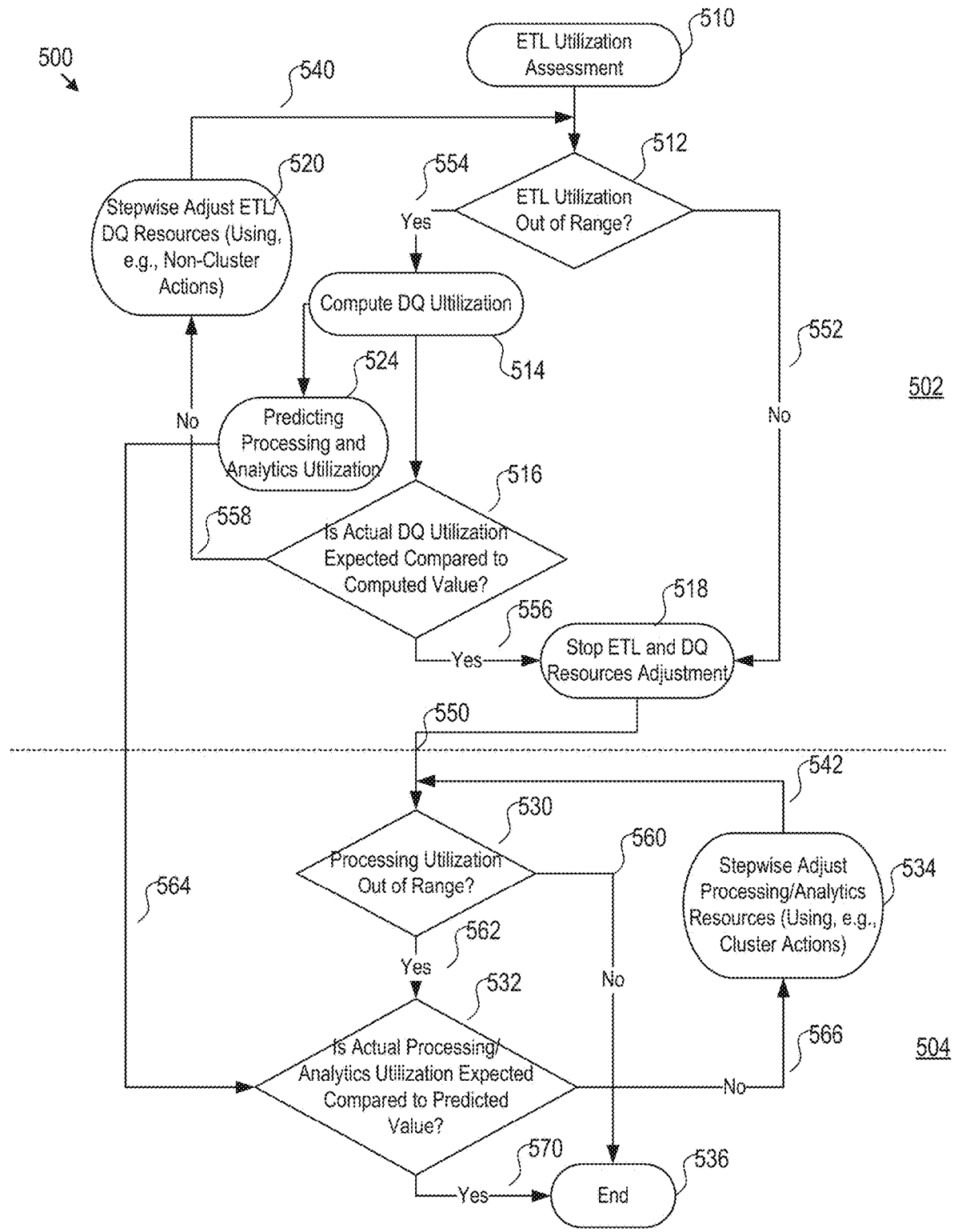
FIG. 5 shows a logic and data flow for controlling elasticity of computing resources in a cloud stack automatically and in real-time.

Other cloud stack status monitoring and resource control functions not included in FIG. 5 as part of the RTCSEC 116 may be implemented in CRAC 118 of the resource manger 106. These functions for example, may include a dashboard for presenting graphical view of the resources and their utilization status. These functions may further include an interface for enabling manual resource configuration command by a user. These commands may generate actions for the resource control circuitry 106, the cloud stack, and the cloud platform vendors to execute. This actions may include but are not limited to start, stop, pause, resize, resume, launch, and terminate a computing resource that may be specified/selected by the user. Authentication for access to the CRAC 118 may be identical to that of the RTCSEC 116 discussed above. In practice, the CRAC and the RTCSEC may be implemented as a single integrated tool. The delineation of CRAC and RTCSEC within the resource controller 106 is to separate the real-time automatic elasticity control function from the rest functions of the resource control circuitry 106.

The functions of the resource control circuitry 106 (including the CRAC 118 and RTSCEM 116), as discussed above, may be implemented by one of more of the exemplary utilities shown in the Table I.

TABLE I

| Modules/Utilities | Function Description |
| --- | --- |
| Key encryption Module (408 of FIG. 4) | All cloud platform vendors have different format of storing credentials. This utility encrypts the credentials from multiple cloud vendors. When a new cloud platform vendor is added using a different format of keys, the encryption of new keys can be defined easily. |
| Role based authentication Module (406 of FIG. 4) | This module checks in the active directory if user details submitted during login are correct or not. This module also checks if the user is member of specific group or not. |

TABLE I-continued

| Modules/Utilities | Function Description |
| --- | --- |
| Multi Factor Authentication(MFA) module (406 of FIG. 4) | This module enhance security while logging in using the console interface. |
| Resource action module | This module implements various actions on a cloud platform e.g. start a resource, resize a resource etc. Actions for various managed services can also be executed. |
| Cloud configuration module | Configuration module holds important information including which cloud does the enterprise has, and also including tool/group based resource coupling information. This module also gives an option to define a few resources which should not be allowed to run any operations on (used for critical resources e.g., firewall and active directory). This module further gives users option to configure the information which should be shown and which should be hidden. |
| Application Secret Keys module (406 of FIG. 4) | This module help configuring various secrets, e.g., One Time Password, Application Secret for token generation, Initialization Vector and Key for AES 256 bit encryption. |
| Logging and alerts module | This module is used to implement the logging trail for the resource controller. All cloud resource actions are tracked, including the type of action, the requesting user, and execution time. This module also allows user to configure a few end recipients who will get alerts when a resource action is triggered. The module also the status of the action status (whether it has succeeded or failed). |
| Server Metrics Collection Module (within 410 of FIG. 4) | This module monitors and collects server metric (CPU, RAM, etc.) and store the metric in, e.g., Elasticsearch. Input to this module can come from cloud vendor logging implementation combined with application logs or it can be extracted using a third party monitoring agents of tools such as Nagios, Splunk, ELK etc. |
| Prediction Module (within 412 of FIG. 4) | This module analyzes past data in elastic search and predicts future utilization and gives recommendations related to capacity planning on cloud vendors. It also gives insights to users on their resource utilization behavior. |
| RTCSEC Engine (412 of FIG. 4) | See Details below |
| Cloud stack controller (414 of FIG. 4) | See details below |

FIG. 5 shows an example logic flow 500 for the RTCSEC engine 412 of FIG. 4 for providing elasticity to a deployed and actively running analytics cloud stack. In the particular implementation of FIG. 5, the real-time elasticity control is provided in a staged (pipelined) manner. Specifically the control is provided as two cascading stages of 502 and 504. In stage 502, computing resources allocated to the ETL/DQ layer (layers 302 and 304 of FIG. 3) are conditionally adjusted (520). In stage 504, computing resources allocated to the processing and analytics layer (layers 306 and 308 of FIG. 3) are conditionally adjusted (534). The real-time resource adjustment is further adapted to the types for the layers (cluster type or non-cluster type, as shown by 520 and 534). For example, the adjustments of the allocated computing resources for the ETL/DQ layers may be based on non-cluster actions (because the software components of the ETL/DQ layers 302 and 304, for example, may be characterized as non-cluster type) whereas the adjustments of the allocated computing resources for the processing and analytical layers may be based on cluster actions (because the software components of the processing and analytics layers 306 and 308 may be characterized as non-cluster type). The adjustment actions of allocated computing resources may be performed on a stepwise manner and iteratively as shown by loops 540 and 542 of FIG. 5. The adjustment actions may be either incremental or decremental, depending on whether the cloud resources of concern is over-utilized or under-utilized.

As shown by the implementation of FIG. 5, the RTCSEC engine 412 first performs ETL resource utilization assessment (510) by, e.g., gathering various utilization parameters associated with ETL tools monitored by the monitoring agents 322-334 of FIG. 4 and collected by the cloud stack monitor function unit 410 of FIG. 4. As discussed above, these parameters may directly or indirectly provide real-time monitoring such as CPU utilization, memory utilization, network utilization and the like for the ETL software components, at various levels including the job level, the software component level, the software layer level, and the software stack level. The CPU utilization and memory utilization, for example, may be measured in percentage of usage. The network utilization, for another example, may be measured in number of bytes of data communicated by the ETL software components.

The ETL resource utilization assessment may be used as a direct trigger of cloud resource adjustment actions in stage 502 for the ETL and DQ layers 302 and 304. According to the implementation of FIG. 5, the ETL resource utilization assessment further acts as an indirect trigger of cloud resource adjustment actions in stage 504 for the processing and analytics layers 306 and 308, via stage 502, as shown by the bridging arrow 550. Using ETL resource utilization in addition to the utilization of the processing and analytics layer 306 and 308 alone to trigger resource adjustment actions for the data processing and analytics layers 306 and 308 may be based on the notion that the ETL layer 302 is responsible for preparing, transforming and loading input data and its activity is thus likely a good indication of what is to be expected in the downstream layers such as the processing layer 306 and the analytics layer 308.

Continuing with FIG. 5, the RTCSEC engine 412 may then determine whether the ETL utilization is out of range. For example, the RTCSEC engine 412 may determine whether the CPU utilization, memory utilization, and network utilization of the ETL layer 302 are above a high CPU utilization threshold, a high memory utilization threshold, and a high network utilization threshold, respectively. Utilization above high thresholds may indicate that the ETL layer 302 is over-utilized. For another example, the RTCSEC engine 412 may determine whether the CPU utilization, memory utilization, and network utilization of the ETL layer 302 are below a low CPU utilization threshold, a low memory utilization threshold, and a low network utilization threshold, respectively. Utilization below the low thresholds may indicate that the ETL layer 302 is under-utilized. The thresholds may be generally predetermined (90% for high CPU or memory utilization, 10% for low CPU or memory utilization, for example). The high and low thresholds may alternatively be generated using some prediction model for utilization thresholds. Such a prediction model, for example, may be trained using historical usage and performance data, and characteristics data for the resources used by the ETL layer, collected by the resource control circuitry 106 from the same cloud stack, or other cloud stacks for similar projects of the same enterprise or other enterprises.

If the RTCSEC engine 412 determines that the ETL utilization is within range, then there may be no need to make any resource adjustment to the ETL layer 302 and the DQ layer 304, as shown by branch arrow 552 and 518. However, if the ETL utilization is out of range, then the RTCSEC engine 412 determines that the ETL and DQ resources may potentially need to be adjusted, as shown by branch 554, and may then proceed further to determine whether actual adjustment actions should be performed (514 and 516).

In particular, the RTCSEC engine 412 may perform a computation of resource utilization of the DQ layer 304 based on the ETL utilization and historical data containing seasonal information of ETL and DQ utilization (514). Such calculation may be based on a predictive model trained using historical data collected by the resource control circuitry 106. The computed DQ utilization may then be compared to the monitored and recorded real-time utilization of the DQ layer (516). If the actual DQ utilization is expected as compared to the computed DQ utilization, then the RTCSEC engine 412 determines that ETL and DQ layers 302 and 304 needs no further resource adjustment, as shown by branch 556. For example, when the ETL utilization is above the high threshold but actual DQ utilization is lower than the computed DQ utilization, the RTCSEC engine 412 may determine that the DQ utilization is expected to be high and performs no incremental resource adjustment action for the ETL and DQ layers 302 and 304. For another example, when the ETL utilization is below the low threshold but actual DQ utilization is higher than the computed DQ utilization, the RTCSEC engine 412 may determine that the DQ utilization is expected to be low and performs no decremental resource adjustment action for the ETL and DQ layers 302 and 304. The rationale behind this implementation is that the computed (or predicted) DQ utilization includes historical consideration such as seasonal information (because of the prediction model) and such seasonal information has already been taken into consideration when the cloud stack is initially deployed. As such, the high or low actual DQ utilization may be expected and acceptable if it is not above or below the predicted utilization.

If the actual DQ utilization is unexpected as compared to the computed DQ utilization, then the RTCSEC engine 412 determines that ETL and DQ layers 302 and 304 need resource adjustment, as shown by branch 558. For example, when the ETL utilization is above the high threshold and the actual DQ utilization is higher than the computed DQ utilization, the RTCSEC engine 412 may determine that the DQ utilization is unexpectedly high and incremental resource adjustment actions for the ETL and DQ layers 302 and 304 should be performed. For another example, when the ETL utilization is below the low threshold and the actual DQ utilization is lower than the computed DQ utilization, the RTCSEC engine 412 may determine that the DQ utilization is unexpectedly low and decremental resource adjustment actions for the ETL and DQ layers 302 and 304 should be performed. Unexpected utilization usually indicates activities in the cloud stack that are unusual and that are not seasonal/historical and thus may need to be coped with by adjusting resource allocations in real-time.

Once the RTCSEC engine 412 determines that resource adjustment actions for the ETL and DQ layers 302 and 304 are needed, it may perform the adjustment actions in a stepwise and iterative fashion, as shown by 520 and the looping arrow 540. In particular, cloud resource adjustment actions may be performed in steps and according to the layer types for the ETL and DQ layer (cluster or non-cluster). The cloud resource adjustment actions may be sent to the cloud platforms via the cloud stack controller 414 of FIG. 4 using, e.g., Application Programming Interfaces (APIs) for the cloud platforms.

Figure 6:
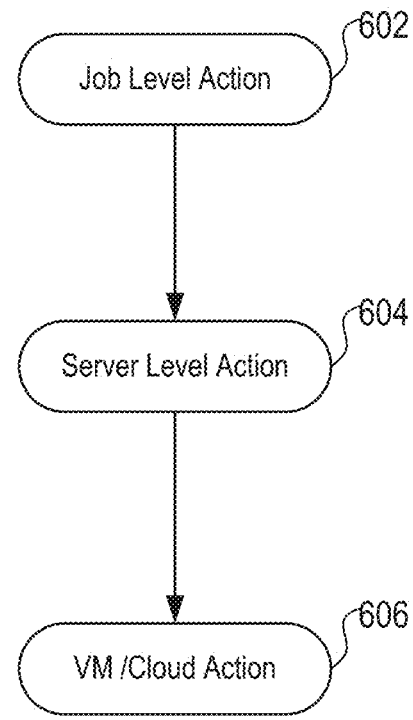
FIG. 6 shows various progressive levels of control of elasticity of computing resources in a cloud stack.

The stepwise and iterative adjustment actions for the ETL and DQ layers 302 and 304 may be performed in a hierarchical manner, as shown in FIG. 6. For example, adjustment actions may be performed progressively on a job level (602), a server level (604), and a virtual machine and cloud level (606). In one implementation, the adjustment actions at these three levels may be alternated or interlaced in the adjustment loop formed by 512, 514, 516, and 520 of FIG. 5. In an alternative implementation, the loop may be performed stepwise at one level at a time until the loops break via branches 552 or 556. For this alternative implementation, if the ETL and DQ utilization can be brought within threshold or expectation at a lower level (job level is lower than server level, which is lower than the VM/cloud level), then there would be no need to make any adjustment at a higher level.

The adjustment actions performed at each level may further depend on the type of the layers (cluster or non-cluster). Adjustment actions for a layer of non-cluster type at the job level (602 of FIG. 6) may include increasing or decreasing job memory, increasing/decreasing thread capacity at job level, increasing/decreasing other specific tuning parameters learned based on a model trained based on historical data for similar jobs. Adjustment for a layer of cluster type at the job level may include all the action above for a non-cluster layer and may additionally include adding or removing similar jobs. Adjustment actions for a layer of non-cluster type at the server level (604 of FIG. 6) may include increasing or decreasing server memory, increasing/decreasing thread capacity at server level, increasing/decreasing other specific tuning parameters learned based on a model trained based on historical data for similar servers.

Adjustment for a layer of cluster type at the server level may include all the action above for a non-cluster layer and may additionally include adding or removing server instances. Adjustment actions for a layer of non-cluster type at the VM/cloud level (606 of FIG. 6) may include increasing or decreasing the VM memory, increasing/decreasing CPU capacity at VM level, increasing/decreasing other specific tuning parameters learned based on a model trained based on historical data for similar virtual machines. Adjustment for a layer of cluster type at the VM/cloud level may include all the actions above for a non-cluster layer and may additionally include adding or removing virtual machines.

In the implementation of FIG. 5 and as an example, the ETL/DQ layers are assumed to be of non-cluster type. As such, the stepwise and iterative resource adjustment actions (520) may be implemented following the description above for non-cluster type adjustment actions at each of the three different levels.

The step size for adjustment of resources taken by the RTCSEC engine 412 in 520 of FIG. 5, e.g., the amount of one step of increase/decrease in CPU or memory allocation, may be determined by the minimum resource allocation units specified by the cloud platforms. For example, some cloud platform may require that the memory allocation be made in specific manners, e.g., doubled or halved at the minimum.

Continuing with FIG. 5, once the ETL/DQ utilization is brought into range and into expectation, the resource adjustment at stage 502 for the ETL and DQ layer 302 and 304 is complete. The RTCSEC engine 412 may continue to perform adjustment in stage 504 for the processing and analytics layers 406 and 408, as indicated by the arrow 550. In particular, the RTCSEC engine 412 may first determine whether the processing utilization is out of range. For example, the RTCSEC engine 412 may determine whether the CPU utilization, memory utilization, and network utilization of the processing layer 306 are above a high CPU utilization threshold, a high memory utilization threshold, and a high network utilization threshold, respectively. Utilization above the high thresholds may indicate that the processing layer 306 is over-utilized. For another example, the RTCSEC engine 412 may determine whether the CPU utilization, memory utilization, and network utilization of the processing layer 306 are below a low CPU utilization threshold, a low memory utilization threshold, and a low network utilization threshold, respectively. Utilization below the low thresholds may indicate that the processing layer 306 is under-utilized. The thresholds may be generally predetermined (90% for high CPU or memory utilization, 10% for low CPU or memory utilization, for example). The thresholds may alternatively be generated using some prediction model for utilization thresholds. Such a prediction model, for example, may be trained using historical usage and performance data, and characteristics data for the resources used by the processing layer, collected by the resource control circuitry 106 from the same cloud stack, or other cloud stacks for similar projects of the same enterprise or other enterprises.

If the RTCSEC engine 412 determines that the processing utilization is within range, then there may be no need to make any resource adjustment to the processing layer 306 and the analytics layer 308, as shown by branch arrow 560 and 536. However, if the processing utilization is out of range, then the RTCSEC engine 412 may determine that the processing and analytics resources may potentially need to be adjusted, as shown by branch 562, and may then proceed to further determine whether actual adjustment actions should be performed (532 and 534).

In particular, the RTCSEC engine 412 may use a prediction of resource utilization of the processing and the analytics layer 306 and 308 calculated in 524 during the adjustment state 502, as indicated by arrow 564. As shown by 514 and 524, such prediction of the processing and analytics utilization may be calculated using the computed DQ utilization and a predictive model for the processing and analytics utilization. Again, such a model may be trained based on historical data collected by the resource control circuitry 106. The predicted processing and analytics utilization may then be compared to the real-time monitored and recorded utilization of the processing and analytics layers 306 and 308 (532). If the actual processing and analytics utilization is expected as compared to the computed processing and analytics utilization, then the RTCSEC engine 412 determines that processing and analytics layers 306 and 308 need no further resource adjustment, as shown by branch 570. For example, when the processing utilization is above the high threshold but actual processing and analytics utilization is lower than the predicted processing and analytics utilization, the RTCSEC engine 412 may determine that that the processing and analytics utilization is expected to be high and performs no incremental resource adjustment action for the processing and analytics layers 302 and 304. For another example, when the processing utilization is below the low threshold but actual processing and analytics utilization is higher than the predicted processing and analytics utilization, the RTCSEC engine 412 may determine that that the processing and analytics utilization is expected to be low and performs no decremental resource adjustment action for the processing and analytics layers 306 and 308. The rationale behind this implementation is that the predicted processing and analytics utilization includes historical consideration such as seasonal information (because of the prediction model) and such seasonal information has already be taken into consideration when the cloud stack is initially deployed. As such, the high or low actual utilization may be expected and acceptable if it is not above or below the predicted utilization.

If the actual processing and analytics utilization is unexpected as compared to the predicted utilization, then the RTCSEC engine 412 determines that data processing and analytics layers 306 and 308 need resource adjustment, as shown by branch 566. For example, when the processing utilization is above the high threshold and the actual data processing and analytics utilization is higher than the predicted utilization, the RTCSEC engine 412 may determine that the processing and analytics utilization is unexpectedly high and incremental resource adjustment actions for the data processing and analytics layers 306 and 308 should be performed. For another example, when the processing utilization is below the low threshold and the actual processing and analytics utilization is lower than the computed utilization, the RTCSEC engine 412 may determine that the processing and analytics utilization is unexpectedly low and decremental resource adjustment actions for the processing and analytics layers 302 and 304 should be performed. Unexpected utilization usually indicates activities in the cloud stack that are unusual and that are not seasonal/historical and thus may need to be coped with by adjusting resource allocations in real-time.

Once the RTCSEC engine 412 determines that resource adjustment actions for the processing and analytics layers 306 and 308 are needed, it may perform the adjustment actions in a stepwise and iterative fashion, as shown by 534 and the looping arrow 542. In particular, cloud resource adjustment actions may be performed in steps and hierarchically (in different levels, e.g., job level, server level, and VM/cloud level) and according to the layer types for the processing and analytics layers (cluster type or non-cluster type). These adjustment actions are performed similar to the adjustment actions for the ETL and DQ layers 302 and 304 in step 520 of stage 502 in FIG. 5 as described in detail above, and will not be duplicated herein.

In the example implementation of FIG. 5 for the RTCSEC engine 412, the real-time elasticity is achieved by adjusting the resources in the cloud stack i) in a stepwise fashion, ii) in a staged or pipelined manner as to the various layers of the stack, and iii) using hierarchical approach as to the levels of computing resources, iv) based on different set of levels depending on the type of layers (cluster or non-cluster), v) with single user interface for controlling cloud stack using diverse resources from different cloud resource providers; and/or vi) with multi-level secure access and credential management for users. Such implementation provides technical solution to a problem of achieving real-time elasticity of cloud stacks and enhanced efficiency of consuming cloud computing resources. The resource allocation and elasticity problem is rooted in computer technology as such problems do not have equivalents in other fields of technologies and cannot be performed in human minds. The solution provided above further relies on various prediction models trained using historical data and using machine-learning algorithms that are not performable using pens and papers, and in human minds.

Figure 7:
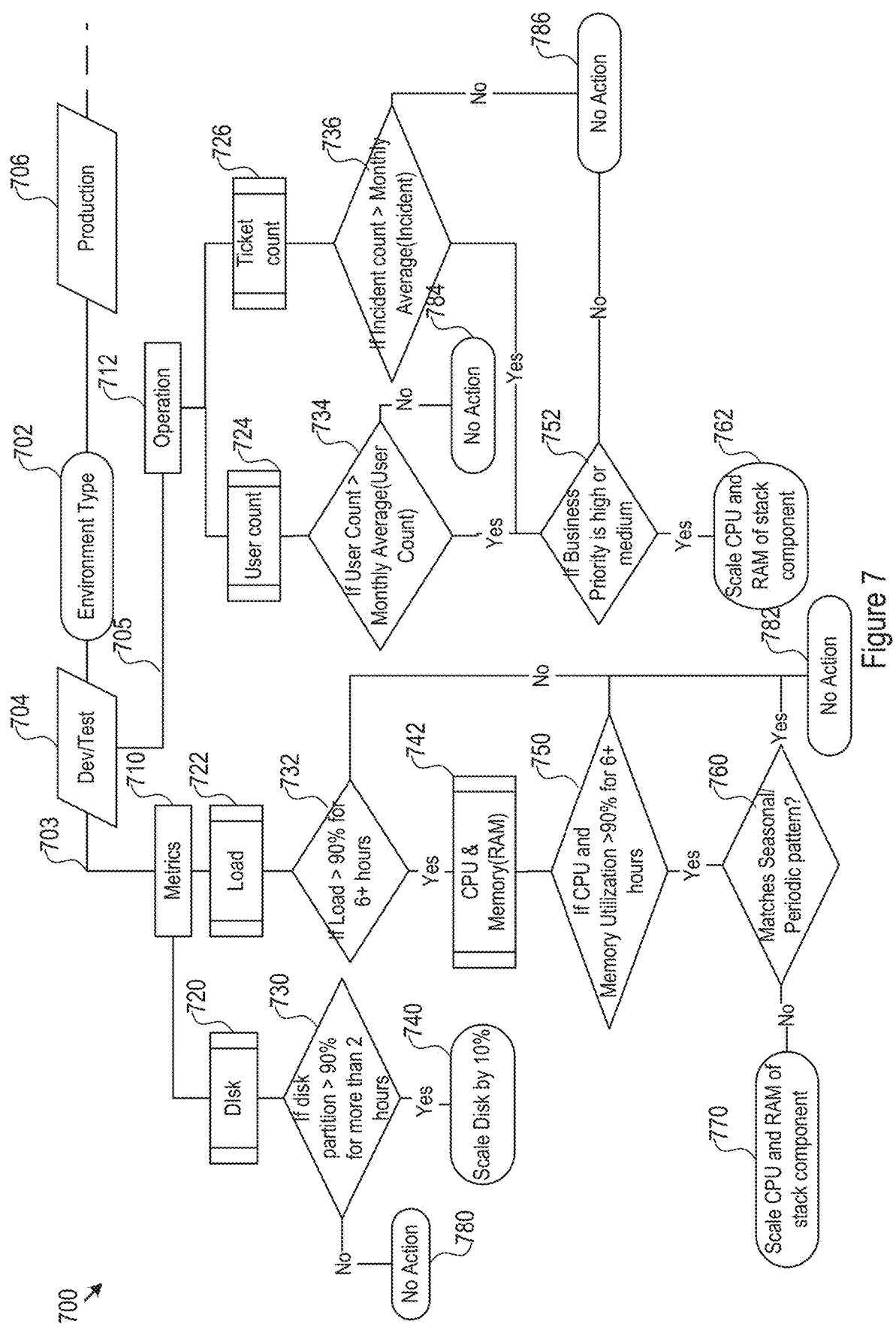
FIG. 7 shows another logic and data flow for controlling elasticity of computing resources in a cloud stack automatically and in real-time.

FIG. 7 illustrates another implementation 700 for a logic flow of the RTCSEC engine 412 for controlling elasticity of a deployed and actively running cloud stack. In FIG. 7, a project may be partitioned into distinct environments (702), such as dev/test environment 704 and production environment 706. These environments may be deployed as independent and separate cloud stacks. The elasticity control of each of these cloud stacks may be implemented similarly. As such, FIG. 7 only shows this implementation as to the dev/test environment 704. In this implementation, the elasticity of the dev/testing cloud stack is controlled by scaling resources in a mix of level of a particular type of resource (regardless of software components) (branch 703) and level of software components (branch 705). For example, the parameters monitored by the cloud stack monitor function unit 410 as described above may be constructed as a data matrix of software components and cloud resources. This data matrix may be analyzed using a trained analytical model to produce scores in broad categories. These categories may include but are not limited to metrics scores 710 and operation scores 712. The metrics scores may further include but are not limited to disk utilization scores 720 and processing load scores 722. The operation scores 712 may further include but are not limited to user count scores 724 and help ticket scores 726. These scores may be then used for determining whether the resources of the cloud stack should be scaled up or down at the resource level as shown in 730 and 732, or at the software component level, as shown by 734 and 736. For example, as shown in 730 and 740, if the RTCSEC engine 412 determines that a disk partition is utilized more than a threshold, e.g., 90%, for more than a predetermined period of time, e.g., 2 hours, it may invoke cloud adjustment actions to scale the disk partition by a predetermined amount, e.g., 10%, and take no adjustment action if otherwise (780). For another example, as shown in 732, 742, 750, 760, and 770, if the RTCSEC engine 412 determines that a load level is more than another threshold, e.g., 90%, for more than another predetermined period of time, e.g., 6 hours and such condition is unexpected (e.g., does not match any seasonal periodic pattern, 760), it may invoke cloud adjustment actions to scale the CPU and memory (e.g., RAM) allocation by another predetermined amount or percentage, and take no adjustment action if otherwise (780). For another example, as shown in 724, 734, 752, 762, 726, and 736, if the RTCSEC engine 412 determines that the current user count (or ticket count) is larger than a monthly average user count (ticket count) for a particular software component, and the business priority or importance of the software component is medium or high, it may scale resources (e.g., CPU and memory) for the software component by some predetermined amount, and take no action if the current user count (or ticket count) is not larger than a monthly average user count for a particular software component or the business priority or importance of the software component is not medium or high (784 and 786).

Multiple implementations has been disclosed herein. In one implementation a system for real-time control of cloud computing resources allocated to an active cloud stack is described. The system may include a repository for storing a first predictive model and cloud stack configuration, and processing circuitry in communication with the repository and with the active cloud stack. The processing circuitry may be configured to identify a first collection of software components of a software stack of the active cloud stack as a first, or upstream layer of the software stack based on the cloud stack configuration, identify a second collection of software components of the software stack as a second, or middle layer of the software stack based on the cloud stack configuration, wherein the middle layer consumes data generated by the upstream layer. The processing circuitry may be further configured to iteratively cause adjustment of computing resources allocated to the upstream layer and the middle layer of the software stack by communicating, by the processing circuitry, with the active cloud stack to obtain cloud resource utilization parameters for the software stack in real-time; extracting, by the processing circuitry, a first real-time resource utilization measure of the upstream layer and a second real-time resource utilization measure of the middle layer based on the cloud resource utilization parameters; and upon determining by the processing circuitry that the first real-time resource utilization measure is outside a first predetermined range, calculating, by the processing circuitry, a predicted resource utilization of the middle layer based on the first real-time resource utilization measure and using the first predictive model, and when the second real-time resource utilization measure of the middle layer is unexpectedly higher or lower than the predicted resource utilization of the middle layer, generating by the processing circuitry a first instruction for adjusting the computing resources allocated to the upstream layer and the middle layer by a first predetermined amount, and sending by the processing circuitry the first instruction to the active cloud stack for execution.

In any of the systems above, the software stack may include a data analytics stack and wherein the upstream layer may include a data extraction, transformation, and loading layer.

In any of the systems above, the middle layer may include a data quality layer. In the system of claim 1, the repository may further store a second predictive model and wherein the processing circuitry may be further configured to identify a third collection of software components of the software stack of the active cloud stack as a third, or downstream layer, wherein downstream layer consumes data generated by the middle layer. The system circuitry may be further configured to iteratively cause adjustment of computing resources allocated to the downstream layer by extracting, by the processing circuitry, a third real-time resource utilization measure of the downstream layer based on the cloud resource utilization parameters; and upon determining by the processing circuitry that the third real-time resource utilization measure is outside a second predetermined range, calculating, by the processing circuitry, a predicted resource utilization of the downstream layer based on at least one of the first real-time resource utilization measure and the second real-time resource utilization measure, and using the second predictive model, and when the third real-time resource utilization measure of the downstream layer is unexpectedly higher or lower than the predicted resource utilization of the downstream layer, generating by the processing circuitry a second instruction for adjusting the computing resources allocated to the downstream layer by a second predetermined amount, and sending by the processing circuitry the second instruction to the active cloud stack for execution.

In any of the systems above, the processing circuitry may be further configured to identify each of the upstream layer, the middle layer, and the downstream layer of the software stack as belonging to a cluster type or a non-cluster type, wherein a layer of the cluster type includes at least one software component running on distributed cloud computing nodes; a layer of the non-cluster type includes software components running on dedicated computing nodes; the cluster type is associated with a first set of cloud adjustment actions and the non-cluster type is associated with a second set of cloud adjustment actions; and the first instruction for adjusting the computing resources allocated to the upstream layer and middle layer and the second instruction for adjusting computing resources allocated to the downstream layer each include adjustment actions selected from the first set of cloud adjustment actions and the second set of cloud adjustment actions based on the identified types for the upstream layer, the middle layer, and the downstream layer.

In any of the systems above, the first set of cloud adjustment actions encompass the second set of cloud adjustment actions and additionally include a cloud adjustment action for adding or removing a cloud computing node for a distributed software component.

In any of the systems above, the software stack may include a data analytics stack, the upstream layer of the software stack may include a data extraction, transformation, and loading layer, the middle layer of the software stack may include one or more of a data quality layer, a data processing layer, a data analytics layer, a rule layer, a data storage layer, and/or a dashboard layer, and, similarly, the downstream layer of the software stack may include one or more of a data quality layer, a data processing layer, a data analytics layer, a rule layer, a data storage layer, and/or a dashboard layer.

In any of the systems above, the first instruction for adjusting the computing resources allocated to the upstream layer and the middle layer, during the iterative process, may include cloud resource adjustment actions that alternate between job level resource allocation adjustment action, server level resource allocation adjustment action, and virtual machine level allocation adjustment action.

In any of the systems above, the active cloud stack may include cloud computing resources provisioned by at least two independent cloud provisioning circuitries with distinct credential and access key schemes. In the systems above, the processing circuitry may be further configured to provide a single user interface and a single multi-factor authentication scheme.

In any of the systems above, the repository may further include a third predictive model and the processing circuitry may be further configured to receive a user specification and requisition for deployment of a cloud stack before the active cloud stack was deployed, automatically determine a predicted software stack and a cloud resource configuration based on the user specification and using the third predictive model, and automatically deploy the active cloud stack according to the predicted software stack and the cloud resource configuration.

In another implementation, a method for real-time control of cloud computing resources allocated to an active cloud stack by a cloud resource control circuitry is described. The method may include comprising retrieving cloud stack configuration for the active cloud stack from a configuration repository, identifying a first collection of software components of a software stack of the active cloud stack as a first, or upstream layer of the software stack based on the cloud stack configuration, and identifying a second collection of software components of the software stack as a second, or middle layer of the software stack based on the cloud stack configuration, wherein the middle layer consumes data generated by the upstream layer. The method may further include iteratively causing adjustment of computing resources allocated to the upstream layer and the middle layer of the software stack by communicating with the active cloud stack to obtain cloud resource utilization parameters for the software stack in real-time; extracting a first real-time resource utilization measure of the upstream layer and a second real-time resource utilization measure of the middle layer based on the cloud resource utilization parameters; and upon determining that the first real-time resource utilization measure is outside a first predetermined range, calculating a predicted resource utilization of the middle layer based on the first real-time resource utilization measure and using a first predictive model retrieved from a model repository, and when the second real-time resource utilization measure of the middle layer is unexpectedly higher or lower than the predicted resource utilization of the middle layer, generating a first instruction for adjusting the computing resources allocated to the upstream layer and the middle layer by a first predetermined amount, and sending the first instruction to the active cloud stack for execution.

In the method above, the software stack may include a data analytics stack, the upstream layer may include a data extraction, transformation, and loading layer, and the middle layer may include a data quality layer.

Any of the methods above may further include identifying a third collection of software components of the software stack of the active cloud stack as a third, or downstream layer, wherein the downstream layer consumes data generated by the middle layer; iteratively causing adjustment of computing resources allocated to the downstream layer by extracting a third real-time resource utilization measure of the downstream layer based on the cloud resource utilization parameters; and upon determining that the third real-time resource utilization measure is outside a second predetermined range, calculating a predicted resource utilization of the downstream layer based on at least one of the first real-time resource utilization measure and the second real-time resource utilization measure, and using a second predictive model retrieved from the model repository, and when the third real-time resource utilization measure of the downstream layer is unexpectedly higher or lower than the predicted resource utilization of the downstream layer, generating a second instruction for adjusting the computing resources allocated to the downstream layer by a second predetermined amount, and sending the second instruction to the active cloud stack for execution.

Any of the methods above may further include identifying each of the upstream layer, the middle layer, and the downstream layer of the software stack as belonging to a cluster type or a non-cluster type, wherein a layer of the cluster type includes at least one software component running on distributed cloud computing nodes, a layer of the non-cluster type includes software components running on dedicated computing nodes, the cluster type is associated with a first set of cloud adjustment actions and the non-cluster type is associated with a second set of cloud adjustment actions, and the first instruction for adjusting the computing resources allocated to the upstream layer and middle layer and the second instruction for adjusting computing resources allocated to the downstream layer each include adjustment actions selected from the first set of cloud adjustment actions and the second set of cloud adjustment actions based on the identified types for the upstream layer, the middle layer, and the downstream layer.

In any of the methods above, the first set of cloud adjustment actions encompass the second set of cloud adjustment actions and additionally include a cloud adjustment action for adding or removing a cloud computing node for a distributed software component.

In any of the methods above, the software stack may include a data analytics stack, the upstream layer of the software stack may include a data extraction, transformation, and loading layer, the middle layer of the software stack may include a data quality layer, and the downstream layer of the software stack may include a data processing or a data analytics layer.

In any of the methods above, the first instruction for adjusting the computing resources allocated to the upstream layer and the middle layer, during the iterative process, may include cloud resource adjustment actions that alternate between job level resource allocation adjustment action, server level resource allocation adjustment action, and virtual machine level allocation adjustment action.

In any of the methods above, the active cloud stack may include cloud computing resources provisioned by at least two independent cloud provisioning circuitries with distinct credential and access key schemes, and wherein the method may further include providing a single user interface and a single multi-factor authentication scheme.

Any of the methods above may, further include receiving a user specification and requisition for deployment of a cloud stack before the active cloud stack was deployed, automatically determining a predicted software stack and a cloud resource configuration based on the user specification and using a third predictive model retrieved from the model repository; and automatically deploying the active cloud stack according to the predicted software stack and the cloud resource configuration.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in tangible storage media that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on other machine-readable media. The media may be made-up of a single (e.g., unitary) storage device, multiple storage devices, a distributed storage device, or other storage configuration. A product, such as a computer program product, may include storage media and instructions stored in or on the media, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system for real-time control of cloud computing resources allocated to an active cloud stack, comprising:
   a repository for storing a first predictive model and cloud stack configuration; and
   processing circuitry in communication with the repository and with the active cloud stack, the processing circuitry configured to:
   identify a first collection of software components of a software stack of the active cloud stack as an upstream layer of the software stack based on the cloud stack configuration;
   identify a second collection of software components of the software stack as a middle layer of the software stack based on the cloud stack configuration, wherein the middle layer consumes data generated by the upstream layer; and iteratively cause adjustment of computing resources allocated to the upstream layer and the middle layer of the software stack by:
  communicating, by the processing circuitry, with the active cloud stack to obtain cloud resource utilization parameters for the software stack in real-time;
  extracting, by the processing circuitry, a first real-time resource utilization measure of the upstream layer and a second real-time resource utilization measure of the middle layer based on the cloud resource utilization parameters; and
  upon determining by the processing circuitry that the first real-time resource utilization measure is outside a first predetermined range:
    calculating, by the processing circuitry, a predicted resource utilization of the middle layer based on the first real-time resource utilization measure and using the first predictive model; and
    when the second real-time resource utilization measure of the middle layer is unexpectedly higher or lower than the predicted resource utilization of the middle layer, generating by the processing circuitry a first instruction for adjusting the computing resources allocated to the upstream layer and the middle layer by a first predetermined amount, and sending by the processing circuitry the first instruction to the active cloud stack for execution.

2. The system of claim 1, wherein the software stack comprises a data analytics stack and wherein the upstream layer comprises a data extraction, transformation, and loading layer.

3. The system of claim 2, wherein the middle layer comprises a data quality layer.

4. The system of claim 1, wherein the repository further stores a second predictive model and wherein the processing circuitry is further configured to:
  identify a third collection of software components of the software stack of the active cloud stack as a downstream layer, wherein the downstream layer consumes data generated by the middle layer; and
  iteratively cause adjustment of computing resources allocated to the downstream layer by:
    extracting, by the processing circuitry, a third real-time resource utilization measure of the downstream layer based on the cloud resource utilization parameters; and
    upon determining by the processing circuitry that the third real-time resource utilization measure is outside a second predetermined range:
      calculating, by the processing circuitry, a predicted resource utilization of the downstream layer based on at least one of the first real-time resource utilization measure and the second real-time resource utilization measure, and using the second predictive model; and
      when the third real-time resource utilization measure of the downstream layer is unexpectedly higher or lower than the predicted resource utilization of the downstream layer, generating by the processing circuitry a second instruction for adjusting the computing resources allocated to the downstream layer by a second predetermined amount, and sending by the processing circuitry the second instruction to the active cloud stack for execution.

5. The system of claim 4, wherein the processing circuitry is further configured to identify each of the upstream layer, the middle layer, and the downstream layer of the software stack as belonging to a cluster type or a non-cluster type, wherein:
  a layer of the cluster type includes at least one software component running on distributed cloud computing nodes;
  a layer of the non-cluster type includes software components running on dedicated computing nodes;
  the cluster type is associated with a first set of cloud adjustment actions and the non-cluster type is associated with a second set of cloud adjustment actions; and
  the first instruction for adjusting the computing resources allocated to the upstream layer and middle layer and the second instruction for adjusting computing resources allocated to the downstream layer each include adjustment actions selected from the first set of cloud adjustment actions and the second set of cloud adjustment actions based on the identified types for the upstream layer, the middle layer, and the downstream layer.

6. The system of claim 5, wherein the first set of cloud adjustment actions encompass the second set of cloud adjustment actions and additionally include a cloud adjustment action for adding or removing a cloud computing node for a distributed software component.

7. The system of claim 4, wherein:
  the software stack comprises a data analytics stack;
  the upstream layer of the software stack comprises a data extraction, transformation, and loading layer;
  the middle layer of the software stack comprises a data quality layer; and
  the downstream layer of the software stack comprises a data processing or a data analytics layer.

8. The system of claim 1, wherein the first instruction for adjusting the computing resources allocated to the upstream layer and the middle layer, during the iterative process, comprises cloud resource adjustment actions that alternate between job level resource allocation adjustment action, server level resource allocation adjustment action, and virtual machine level allocation adjustment action.

9. The system of claim 1, wherein the active cloud stack comprises cloud computing resources provisioned by at least two independent cloud provisioning circuitries with distinct credential and access key schemes.

10. The system of claim 9, wherein the processing circuitry is further configured to provide a single user interface and a single multi-factor authentication scheme.

11. The system of claim 1, wherein the repository further comprises a third predictive model and wherein the processing circuitry is further configured to:
  receive a user specification and requisition for deployment of a cloud stack before the active cloud stack was deployed;
  automatically determine a predicted software stack and a cloud resource configuration based on the user specification and using the third predictive model; and
  automatically deploy the active cloud stack according to the predicted software stack and the cloud resource configuration.

12. A method for real-time control of cloud computing resources allocated to an active cloud stack by a cloud resource control circuitry, comprising:
  retrieving cloud stack configuration for the active cloud stack from a configuration repository;

identifying a first collection of software components of a software stack of the active cloud stack as a upstream layer of the software stack based on the cloud stack configuration;

identifying a second collection of software components of the software stack as a middle layer of the software stack based on the cloud stack configuration, wherein the middle layer consumes data generated by the upstream layer; and iteratively causing adjustment of computing resources allocated to the upstream layer and the middle layer of the software stack by:
 communicating with the active cloud stack to obtain cloud resource utilization parameters for the software stack in real-time;
 extracting a first real-time resource utilization measure of the upstream layer and a second real-time resource utilization measure of the middle layer based on the cloud resource utilization parameters; and
 upon determining that the first real-time resource utilization measure is outside a first predetermined range:
  calculating a predicted resource utilization of the middle layer based on the first real-time resource utilization measure and using a first predictive model retrieved from a model repository; and
  when the second real-time resource utilization measure of the middle layer is unexpectedly higher or lower than the predicted resource utilization of the middle layer, generating a first instruction for adjusting the computing resources allocated to the upstream layer and the middle layer by a first predetermined amount, and sending the first instruction to the active cloud stack for execution.

13. The method of claim 12, wherein:
the software stack comprises a data analytics stack;
the upstream layer comprises a data extraction, transformation, and loading layer; and
the middle layer comprises a data quality layer.

14. The method of claim 12, further comprising:
identifying a third collection of software components of the software stack of the active cloud stack as a downstream layer, wherein the downstream layer consumes data generated by the middle layer; and
iteratively causing adjustment of computing resources allocated to the downstream layer by:
 extracting a third real-time resource utilization measure of the downstream layer based on the cloud resource utilization parameters; and
 upon determining that the third real-time resource utilization measure is outside a second predetermined range:
  calculating a predicted resource utilization of the downstream layer based on at least one of the first real-time resource utilization measure and the second real-time resource utilization measure, and using a second predictive model retrieved from the model repository; and
  when the third real-time resource utilization measure of the downstream layer is unexpectedly higher or lower than the predicted resource utilization of the downstream layer, generating a second instruction for adjusting the computing resources allocated to the downstream layer by a second predetermined amount, and sending the second instruction to the active cloud stack for execution.

15. The method of claim 14, further comprising identifying each of the upstream layer, the middle layer, and the downstream layer of the software stack as belonging to a cluster type or a non-cluster type, wherein:
a layer of the cluster type includes at least one software component running on distributed cloud computing nodes;
a layer of the non-cluster type includes software components running on dedicated computing nodes;
the cluster type is associated with a first set of cloud adjustment actions and the non-cluster type is associated with a second set of cloud adjustment actions; and
the first instruction for adjusting the computing resources allocated to the upstream layer and middle layer and the second instruction for adjusting computing resources allocated to the downstream layer each include adjustment actions selected from the first set of cloud adjustment actions and the second set of cloud adjustment actions based on the identified types for the upstream layer, the middle layer, and the downstream layer.

16. The method of claim 15, wherein the first set of cloud adjustment actions encompass the second set of cloud adjustment actions and additionally include a cloud adjustment action for adding or removing a cloud computing node for a distributed software component.

17. The method of claim 14, wherein:
the software stack comprises a data analytics stack;
the upstream layer of the software stack comprises a data extraction, transformation, and loading layer;
the middle layer of the software stack comprises a data quality layer; and
the downstream layer of the software stack comprises a data processing or a data analytics layer.

18. The method of claim 12, wherein the first instruction for adjusting the computing resources allocated to the upstream layer and the middle layer, during the iterative process, comprises cloud resource adjustment actions that alternate between job level resource allocation adjustment action, server level resource allocation adjustment action, and virtual machine level allocation adjustment action.

19. The method of claim 12, wherein the active cloud stack comprises cloud computing resources provisioned by at least two independent cloud provisioning circuitries with distinct credential and access key schemes, and wherein the method further comprises providing a single user interface and a single multi-factor authentication scheme.

20. The method of claim 12, further comprising:
receiving a user specification and requisition for deployment of a cloud stack before the active cloud stack was deployed;
automatically determining a predicted software stack and a cloud resource configuration based on the user specification and using a third predictive model retrieved from the model repository; and
automatically deploying the active cloud stack according to the predicted software stack and the cloud resource configuration.

* * * * *